(12) United States Patent
Kooger et al.

(10) Patent No.: US 12,522,260 B2
(45) Date of Patent: Jan. 13, 2026

(54) COOLING SYSTEM FOR A TRANSPORTATION VEHICLE ARRANGED TO BE TRANSPORTED IN A LOW-PRESSURE ENVIRONMENT

(71) Applicant: Hardt IP B.V., Rotterdam (NL)

(72) Inventors: Bauke Jan Kooger, Rotterdam (NL); Gert Spek, Delft (NL)

(73) Assignee: HARDT IP B.V., Rotterdam (NL)

( * ) Notice: Subject to any disclaimer, the term of this patent is extended or adjusted under 35 U.S.C. 154(b) by 244 days.

(21) Appl. No.: 18/253,801

(22) PCT Filed: Dec. 1, 2021

(86) PCT No.: PCT/NL2021/050726
§ 371 (c)(1),
(2) Date: May 22, 2023

(87) PCT Pub. No.: WO2022/119439
PCT Pub. Date: Jun. 9, 2022

(65) Prior Publication Data
US 2024/0001972 A1    Jan. 4, 2024

(30) Foreign Application Priority Data
Dec. 1, 2020 (NL) ..................... 2027020

(51) Int. Cl.
*B61D 27/00* (2006.01)
*B60H 1/32* (2006.01)
(Continued)

(52) U.S. Cl.
CPC ....... *B61D 27/0072* (2013.01); *B60H 1/3202* (2013.01); *B60L 13/10* (2013.01); *B60H 1/00357* (2013.01)

(58) Field of Classification Search
CPC ... B61D 27/0072; B60L 13/10; B60H 1/3202; B60H 1/00357
See application file for complete search history.

(56) References Cited

U.S. PATENT DOCUMENTS 5,209,078 A    5/1993   Conrad et al.
10,640,240 B2  5/2020   Rector et al.
(Continued)

FOREIGN PATENT DOCUMENTS

CN    111994098 A      11/2020
EP    3569509 A1   *  11/2019  ........... A61F 7/0085

OTHER PUBLICATIONS

Communication Pursuant to Article 94(3) EPC dated Feb. 28, 2025, issued in corresponding European Patent Application No. 21819238.3 (7 pgs.).

(Continued)

*Primary Examiner* — Joseph F Trpisovsky
(74) *Attorney, Agent, or Firm* — Pillsbury Winthrop Shaw Pittman, LLP

(57) ABSTRACT

A cooling system is provided for a transportation vehicle arranged to be transported in a low-pressure environ-ment, the system comprising a sublimation circuit for transporting a sublimation fluid, a first heat exchanger arranged to transfer thermal energy to the sublimation fluid, a sublimation unit comprising a fluid inlet and an open channel structure comprising chan-nels which are in fluid communication with the fluid inlet and with an outer surface of the sublimation unit, a first flow controller for controlling a flow of the sublimation fluid through the sublimation circuit, and a container arranged to hold the sublimation fluid and comprising a container outlet connected to the fluid inlet of the sublimation unit to supply sublimation fluid to the sublimation unit.

19 Claims, 4 Drawing Sheets

(51) Int. Cl.
*B60L 13/10* (2006.01)
*B60H 1/00* (2006.01)

(56) References Cited

U.S. PATENT DOCUMENTS

2018/0370820 A1* 12/2018 Beaudry .................. C02F 1/001
2019/0023427 A1* 1/2019 Fuller ...................... B64G 1/64
2019/0383527 A1 12/2019 Zaffetti et al.

OTHER PUBLICATIONS

Tongue, Stephen et al., "The Porous Sublimator as the X-38/CRV (Crew Return Vehicle) Orbital Heat Sink", SAE Technical Paper Series, SAE International, US, Jan. 1, 1999, XP009500559, Retrieved from the Internet: URL: http://papers.sae.org/1999-01-2004/ (9 pgs.).

International Search Report dated Mar. 1, 2022, issued in corresponding International Application No. PCT/NL2021/050726 (4 pgs.).

Written Opinion of the International Searching Authority dated Mar. 1, 2022, issued in corresponding International Application No. PCT/NL2021/050726 (6 pgs.).

* cited by examiner

COOLING SYSTEM FOR A TRANSPORTATION VEHICLE ARRANGED TO BE TRANSPORTED IN A LOW-PRESSURE ENVIRONMENT

CROSS-REFERENCE TO RELATED APPLICATIONS

This application is the U.S. National Stage of PCT/NL2021/050726, filed Dec. 1, 2021, which claims priority to Netherlands Patent Application No. 2027020, filed Dec. 1, 2020, the contents of each of which are incorporated herein by reference in their entireties.

TECHNICAL FIELD

Aspects and embodiments thereof relate to cooling of transportation vehicles arranged to be transported in a low-pressure environment.

BACKGROUND

There is a need for more environmental-friendly means for transportation, for example compared to planes and cars with internal combustion engines. By moving a transportation vehicle through a low-pressure environment, the energy requirements for transportation may be drastically decreased compared to the energy required for the conventional means for transportation.

The low-pressure environment may be provided in a pipe in which a transportation vehicle may be suspended using electromagnets and permanent magnets. Movement of the transportation vehicle through the pipe may be constituted by linear electric engines. For example, the suspension, electric engines, and optional people present inside the transportation vehicle generate heat.

SUMMARY

The heat generated by and/or inside the transportation vehicle may cause issues when not dissipated into the environment. In conventional cooling systems, convection cooling may be used to for example cool a radiator of a compressive cooling system. However, due to the low pressure surrounding the transportation vehicle—and thus the low amount of thermal capacity of the air surrounding the transportation vehicle—convection cooling may not provide sufficient cooling capacity.

It is hence preferred to provide a cooling system for a transportation vehicle arranged to be transported in a low-pressure environment which has sufficient cooling capacity, even in the low-pressure environment.

A first aspect provides a cooling system for a transportation vehicle arranged to be transported in a low-pressure environment. The system comprises a sublimation circuit for transporting a sublimation fluid, a first heat exchanger arranged to transfer thermal energy to the sublimation fluid, a sublimation unit comprising a fluid inlet and an open channel structure comprising one or more channels which are in fluid communication with the fluid inlet and with an outer surface of the sublimation unit, a first flow controller for controlling a flow of the sublimation fluid through the sublimation circuit, and a container arranged to hold at least part of a volume of the sublimation fluid and comprising a container outlet connected to the fluid inlet of the sublimation unit to supply sublimation fluid to the sublimation unit.

The thermal energy transferred by the first heat exchanger to the sublimation fluid may for example originate from a first part of the vehicle, which may be referred to as a heat source.

The pressure inside the low-pressure environment may be below the triple point of the coolant fluid. For example, the coolant fluid may be water, which may be advantageous for example by virtue of its low costs, lack of toxicity, and easy availability. When water or any other coolant fluid is exposed to a pressure below its triple point, the fluid cannot exist in its liquid phase. Hence, when solid ice is heated and exposed to a pressure below the triple point, it is converted directly into water vapor in the process known as sublimation. It will be understood that water may comprise dissolved particles typically present in water, such as one or more ionised salts and/or minerals.

The solid ice, or other fluid in solid state, may be heated by thermal energy originating from one or more heat sources of a transportation vehicle in a low-pressure environment.

The sublimation unit comprising an open channel structure may imply that at least part of the sublimation unit has a porous structure which allows fluid to flow through the sublimation unit. Distal ends of the channels may end at an outside surface of the sublimation unit, and may hence be in fluid communication with the surroundings of the sublimation unit. A flow path may be provided through the cooling system between the container and the distal ends of the channels.

At least part of the sublimation unit may comprise one or more thermally conductive materials, for example metals such as copper or aluminium, any other thermally conductive material, or any combination thereof. The thermally conductive material may for example be arranged as an open-cell foam, wherein a plurality of adjacent cells provide the channels of the sublimation unit.

Two components being in fluid connection or in fluid communication with each other implies that a flow path for fluid between the two components is provided, for example by part of a sublimation circuit or a cooling circuit.

As an option, the first heat exchanger may be formed by a part of the sublimation unit. Thermal energy may hence be transferred directly from the first part of the transportation vehicle to the sublimation unit, for example by at least one of conduction, convection and radiation.

The sublimation fluid inlet may be connected to the container outlet via the sublimation circuit, such that a flow path for sublimation fluid is provided via the sublimation circuit between the container outlet and the sublimation unit.

As a further option, the sublimation unit may comprise a fluid outlet, the fluid outlet may be in fluid connection with the fluid inlet of the sublimation unit, and the fluid outlet may be in fluid connection with the first flow controller via the sublimation circuit. As such, a first flow path for sublimation fluid may be provided to the sublimation unit to the low-pressure environment, and a second flow path for sublimation fluid may be provided passing through the sublimation unit such that the sublimation fluid may be cooled while passing through the sublimation unit. In particular, the fluid outlet may be positioned downstream of the fluid inlet.

Optionally, the first heat exchanger may be formed by at least one of the sublimation circuit and the sublimation unit. Hence, thermal energy may be directly transferred from a heat source to at least one of the sublimation circuit and the sublimation unit, for example via conduction, convection, radiation, or any combination thereof.

Embodiments of the cooling system may further comprise a cooling circuit for circulating a cooling fluid through, a second heat exchanger, arranged to transfer thermal energy from a heat source to the cooling fluid, and a second flow controller for controlling a flow of the cooling fluid through the cooling circuit, wherein the first heat exchanger is arranged to transfer thermal energy between the cooling fluid and the sublimation fluid.

The cooling circuit may be arranged to absorb thermal energy from one or more parts of the transportation vehicle. This thermal energy may next be transferred to the sublimation circuit and may be discarded out of the transportation vehicle by virtue of the sublimation unit.

For controlling the cooling system, the cooling system may comprise a first temperature sensor arranged to provide a first signal having a value indicative of a first temperature of a first part of the vehicle, a cooling processing unit arranged to: receive the first signal, compare the first signal value with a first threshold, and control, in response to the outcome of the comparison, the first flow controller to control a flow rate of the sublimation fluid in the sublimation circuit.

When the cooling system comprises the second flow controller, the cooling processing unit may be further arranged to control the second flow control to control the flow of the cooling fluid through the cooling circuit.

The first threshold may be a value or an interval. A comparison with a value may for example result in lower, higher or equal. A comparison with an interval may result in inside the interval, outside the interval, above the interval, and/or below the interval.

The sublimation fluid may for example be water, which may for example be purified to reduce the amount of dissolved particles in the water.

A second aspect provides a transportation vehicle arranged to be transported in a low-pressure environment, comprising a cooling system according to the first aspect, wherein the first heat exchanger is arranged to transfer thermal energy from a first part of the vehicle to the sublimation fluid.

The first part may for example be a payload compartment of the transportation vehicle and/or an electromagnetic propulsion module comprised by the transportation vehicle.

The sublimation unit may comprise an exposed section provided on the outside of the transportation vehicle, which exposed section provides the outer surface, and wherein the channels of the sublimation unit are in fluid communication with the low-pressure environment at the exposed section.

A third aspect provides a transportation system comprising a transportation vehicle according to the second aspect, piping for guiding the transportation vehicle and a pressure control system arranged to maintain the pressure level in the piping at 10% or less, up to 1%, up to 0.5%, up to 0.1% or even lower than 0.1% such as up to 0.01% of the pressure outside the piping. The transportation system may comprise a fluid recuperation system for recuperating sublimation fluid from the piping.

A fourth aspect provides a method for cooling a first part of a transportation vehicle travelling in a low-pressure environment, in particular a low-pressure environment within the atmosphere of Earth, comprising the steps of transporting a sublimation fluid from a container through a sublimation circuit to an exposed end of a sublimation unit which is exposed to the low-pressure environment, allowing transfer of thermal energy from the first part of the transportation vehicle to the sublimation fluid, and allowing sublimation fluid to be subsequently solidified and sublimated at the exposed end of the sublimation unit.

BRIEF DESCRIPTION OF THE FIGURES

Aspects and embodiments thereof will be elucidated in conjunction with figures. In the figures, FIG. 1 schematically depicts an embodiment of a transportation system.

DETAILED DESCRIPTION OF THE FIGURES

Figure 1:
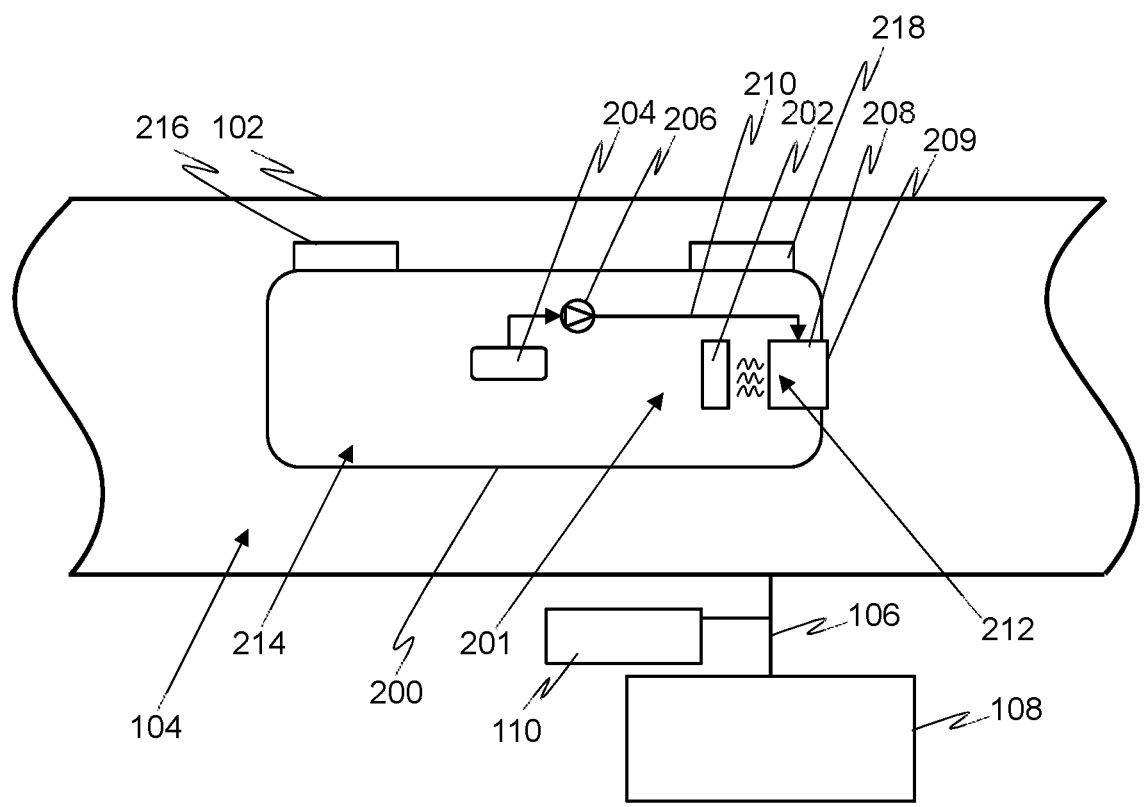

FIG. 1 schematically depicts an embodiment of a transportation system 100, of which a section of piping 102 for guiding a transportation vehicle is shown. Suspended inside the pipe 102 is an embodiment of a transportation vehicle 200. Inside the pipe 102, a low-pressure environment 104 is present. The low-pressure environment 104 may be constituted by a vacuum pump 108 as a pressure control system connected via a gas conduit 106 to the pipe 102. The pressure in the low-pressure environment 104 may for example be below 1000 Pa, 100 Pa, below 50 Pa, or even below 30 Pa. Furthermore, the pressure in the low-pressure environment 104 may be 20% or less, 10% or less, 5% or less or even 1%, 0.1% or less of the pressure outside the piping 102.

The transportation vehicle 200 comprises one or more heat sources, generally indicated with reference numeral 202. A heat source may for example be a passenger, an electrically powered device such as a motor or electromagnet, a radiator of a conventional compressive coolant system, or any other source of thermal energy. The heat source 202 may be a first part of the transportation vehicle 200.

Inside the transportation vehicle 200, a payload compartment 214 may be provided. In the payload compartment 214, space may be provided for accommodating one or more passengers and/or one or more pieces of cargo. The transport vehicle 200 may further comprise a linear electric motor 216 as an electromagnetic propulsion module, and/or a magnetic suspension unit 218. One or both of the linear electric motor 216 and the suspension unit 218 may be at least partially provided outside the payload compartment 214 and may form a heat source which may require cooling.

The transportation vehicle 200 comprises an embodiment of a cooling system 201. The cooling system 201 comprises a sublimation circuit 210 for transporting a sublimation fluid, which may comprise one or more conduits through which transportation of fluid may be constituted between different components of the cooling system 201.

The cooling system 201 further comprises a container 204 arranged to hold a particular volume of sublimation fluid, such as water. The container 204 comprises a container outlet, and an optional container inlet for filling the container 204. The container inlet may be accessible from outside the transportation vessel 200, which may allow convenient refilling of the container 204. The storage volume of the container 204 may depend on a required amount of sublimation fluid, which in turn may depend on the amount of heat which has to be cooled until the next opportunity to refill the container 204.

The cooling system 201 of the transportation vehicle 200 as shown in FIG. 1 is provided with a sublimator 208 as a sublimation unit. The sublimator 208 comprises a fluid inlet which is provided in fluid connection with the container 204, via a conduit of the sublimation circuit 210. An exposed side 209 of the sublimator 208 is provided in fluid communication with the surroundings of the transportation vehicle 200—i.e. with the low-pressure environment 104 inside the pipe 102. Hence, the exposed side 209 as a part of the sublimator 208 may be provided outside the payload compartment 214, and the exposed side 209 may comprise the outer surface of the sublimator 208.

The sublimation circuit 210 may allow transportation of sublimation fluid between the container 204 and the sublimator 208. Inside the sublimator 208, sublimation fluid may flow through an open channel structure comprised by the sublimator 208. A flow path for sublimation fluid may hence be provided between the container 204 and the exposed side 209 of the sublimator, via the sublimation circuit 210 and the open channel structure of the sublimator 208.

At the exposed side 209 of the sublimator 208, the phase of the fluid which is supplied to the sublimator 208 may become solid due to the temperature of the exposed side 209 and/or due to the liquid expanding by virtue of the low pressure at the exposed side—e.g. liquid water may become ice. This ice is exposed to the low pressure inside the piping 102, and may hence sublimate into vapour when the pressure in the low-pressure environment 104 is below the triple point of the sublimation fluid.

This sublimation extracts thermal energy from the sublimator 208, and as such the temperature of the sublimator 208 may reduce further. The temperature will drop at the exposed side 209 of the sublimator first and due to thermal conductance within the sublimator 208, the temperature of the whole sublimator will drop.

As solid sublimation fluid such as ice sublimates into the low-pressure environment 104, the sublimated ice may leave a void which may be substituted by new sublimation fluid supplied to the sublimator 208 via the sublimation circuit 210. The newly supplied sublimation fluid will solidify due to the low temperature of the sublimator 208 and sublimate again. As such, over the course of time that the transportation vehicle 200 is in transit through the pipe 102, the total volume of sublimation fluid inside the transportation vehicle 200 may decrease in proportion to the amount of thermal energy cooled.

The sublimator 208 is provided with an open channel structure comprising channels in fluid communication with the low-pressure environment 104 at the exposed end 209.

In the particular embodiment as shown in FIG. 1, at least part of the sublimator 208 may function as a heat exchanger 212, and as such thermal energy may be transferred from the heat source 202 directly to the sublimator 208. The sublimator 208 may for example be placed in direct contact with a heat source such as an electrically powered device or a radiator. For example via conduction, heat may be transferred from the device to the heat exchanger 212 of the sublimator 208. The thermal energy supplied by the heat source, directly or indirectly, may aid in sublimation of solidified fluid, by virtue of which principle thermal energy is transferred from the transportation vehicle 200 to the evaporated liquid in the piping 102.

The container 204 is provided in fluid connection with a pump 206 as a first flow controller via the sublimation circuit 210. By virtue of the pump 206, sublimation fluid may be pumped from the container 204 to the sublimator 208 to provide a supply and preferably continuous supply of fluid to the sublimator 208 to provide operation and preferably continuous operation of the sublimator to ensure cooling of the transportation vehicle and parts thereof in particular.

Optionally, the transportation system 100 may comprise a condenser 110 as a fluid recuperation system, arranged to filter out vaporized sublimation fluid from the air inside the piping 102. The condenser 110 may be placed between the pipe 102 and the vacuum pump 108, but may also be placed inside the pipe 102. It may be preferred to prevent excess vaporized sublimation fluid from reaching the vacuum pump 108.

As an option applicable in embodiments of the cooling system, such as the embodiment of FIG. 1, a return channel may be provided to place the sublimator 208 in fluid connection with one or both of the container 204 and the pump 206. As such, a closed circuit may be obtained. In the closed circuit, a continuously circulated flow of fluid may be constituted, from the pump to the sublimator 208 and back to the pump via the return channel and optionally also via the container 204.

The heat source 202 may for example be a heat exchanger which is connected in a closed-loop cooling circuit through which a coolant fluid flows. This coolant fluid may flow past and/or through parts of the transportation vehicle for extracting thermal energy from these parts. In particular, the heat exchanger may be formed by part of the sublimator. As such, two separate fluid sources may be connected to the sublimator: one for coolant fluid and one for sublimation fluid. Coolant fluid may leave the sublimator again back into the cooling circuit, whereas the sublimation fluid may leave the sublimator to be sublimated into the low-pressure environment.

Figure 2:
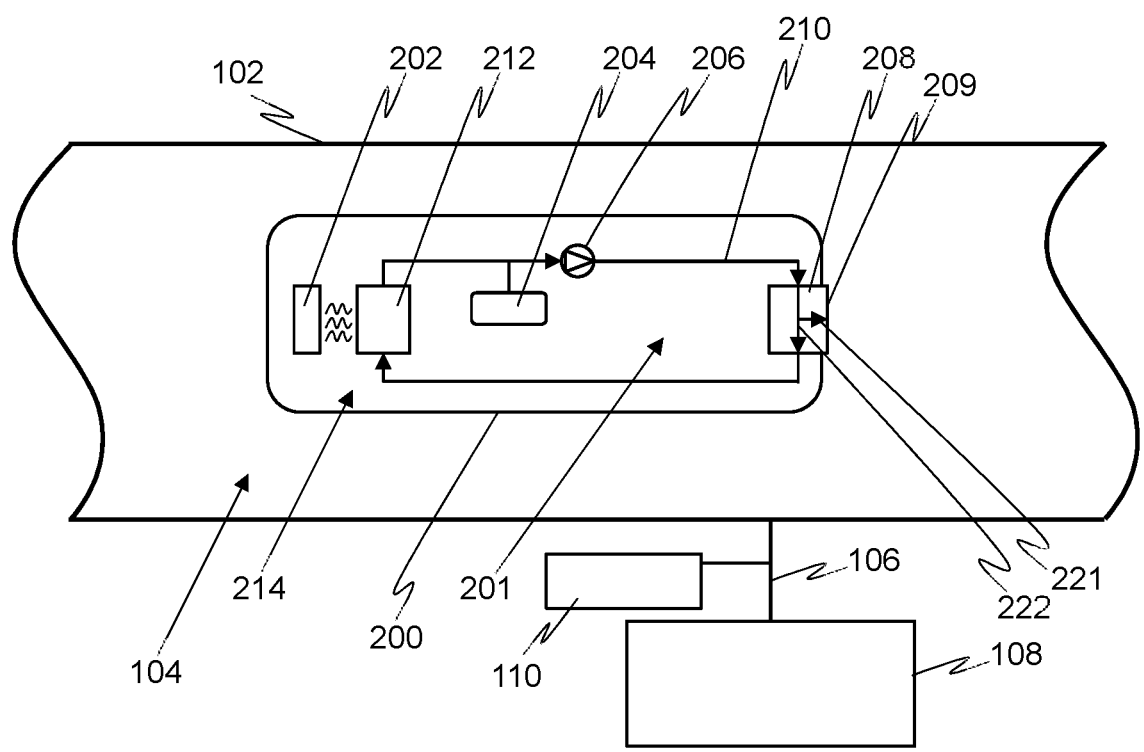
FIG. 2 shows another embodiment of a transportation system.

FIG. 2 shows an embodiment of a transportation vehicle 200 comprising a further embodiment of a cooling system 201. In the particular embodiment of FIG. 2, a heat exchanger 212 is provided separate from the sublimator 208. The heat exchanger 212 is provided in thermal communication with the heat source 202. As such, for example when the temperature of the heat source 202 exceeds the temperature of the heat exchanger 212, thermal energy may be transferred from the heat source 202 to the heat exchanger 212. Thermal energy may for example be transferred via radiation, conduction, convection, or any combination thereof. A transfer of thermal energy from the heat source 202 to the heat exchanger 212 may result in a desired decrease in the temperature of the heat source 202.

In the embodiment of FIG. 2, the sublimation circuit 210 is extended with conduits placing the heat exchanger 212 in fluid connection with the sublimator 208 and the pump 206. For example, the heat exchanger 212 may be placed downstream of the sublimator 208 and upstream of the pump 206.

Sublimation fluid may pass through the sublimator 208. As the sublimation fluid passes through the sublimator 208, thermal energy may be extracted from the sublimation fluid due to the sublimation process taking place at the exposed end 209 of the sublimator, as discussed above. The temperature of the fluid in the sublimation circuit 210 downstream of the sublimator 208 may hence be lower than the temperature of the fluid in the sublimation circuit 210 upstream of the sublimator 208.

In the embodiment of the cooling system 201 of FIG. 2, a semi-closed sublimation circuit 210 is achieved. In particular, a first part 221 of the sublimation fluid flowing through the sublimation circuit 210 at the position of the sublimator 208 flows to the exposed side 209 to be sublimated and a second part 222 of the sublimation fluid flowing through the sublimation circuit 210 at the position of the sublimator remains in the sublimation circuit 210. In particular, this second part 222 is used to receive thermal energy from the heat source 202 at the heat exchanger 212. The sublimation circuit 210 may thus also act as a cooling circuit.

As an option which may applied to any embodiment of the cooling system 201, the cooling system 201 may comprise a container flow controller. The container flow controller may be positioned downstream of the container 204 and upstream of the sublimation circuit 210. The container flow controller may be used to control a flow of sublimation fluid introduced into the sublimation circuit 210 from the container 204. As such, the amount of sublimation fluid added to the sublimation circuit 210 may be controlled independently from the flow of sublimation fluid circulating through the sublimation circuit 210. For example, the container flow controller may comprise a fluid pump.

Figure 3:
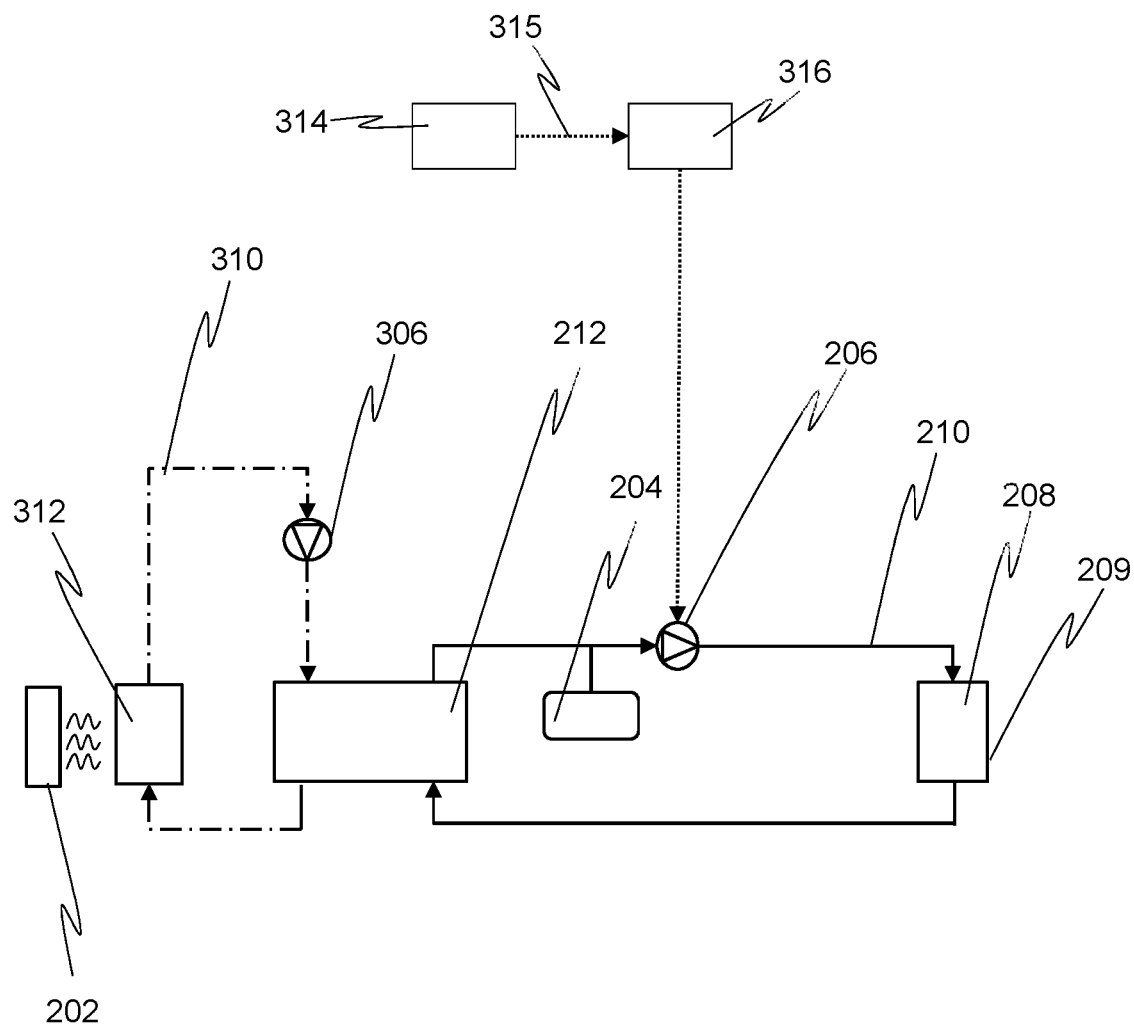
FIG. 3 shows another embodiment of a cooling system.

FIG. 3 shows yet another embodiment of a cooling system 201 for a transportation vehicle 200 arranged to be transported in a low-pressure environment 104. In this particular embodiment, the cooling system 201 comprises a cooling circuit 310 separate from the sublimation circuit 210. A cooling fluid may be circulated through the cooling circuit 310 via an optional pump 306. Contrary to the sublimation circuit 210, the cooling circuit 310 may be a substantially closed circuit.

The cooling fluid may be the same type of fluid as the sublimation fluid, for example water. As another option, the cooling fluid may be a different type of fluid as the sublimation fluid. For example, the cooling fluid may be a liquid, gas, or combination thereof, and may comprise glycol, R-134A, oil, any other suitable coolant, or any combination thereof. In particular, the cooling fluid may have a higher thermal capacity than the sublimation fluid.

In the embodiment of FIG. 3, the first heat exchanger 212 is arranged to transfer thermal energy between the cooling circuit 310 and the sublimation circuit 210, for example from the cooling fluid in the cooling circuit 310 to the sublimation fluid in the sublimation circuit 210.

The cooling circuit 310 may comprise a second heat exchanger 312, arranged to receive thermal energy from the heat source 202. Thermal energy is transferred between the second heat exchanger 313 and the first heat exchanger 212 by virtue of the cooling fluid being circulated through the cooling circuit 310.

In the cooling system 201 as depicted by FIG. 3, the sublimation circuit is embodied as shown by FIG. 2. Alternatively, the sublimation circuit may be embodied as shown by FIG. 1.

Optionally, part of the cooling circuit 310 may act as a heat exchanger. Furthermore, parts of the transportation vehicle 200 itself may act as a heat exchanger receiving thermal energy from a heat source 202 inside the transportation vehicle 200.

A transportation vehicle 200 may comprise any number of separate cooling circuits. Particular heat sources which generate high amounts of thermal energy may be provided with a separate cooling circuit. A cooling circuit 310 may comprise any number of heat exchangers, and/or a sublimation circuit 210 may also comprise any number of heat exchangers for receiving thermal energy from any number of cooling circuits.

As an option also applicable in other embodiments of the cooling system 201, the cooling system 201 of FIG. 3 comprises a first temperature sensor 314 arranged to provide a first signal 315 having a value indicative of a first temperature of the first part of the vehicle.

As a further option, the cooling system 201 comprises a cooling processing unit 316. The cooling processing unit 316 is arranged to receive the first signal 315, to compare the first signal value with a first threshold, and to control, in response to the outcome of the comparison, the pump 206 to control a flow rate of the sublimation fluid in the sublimation circuit 210.

The cooling processing unit 316 may comprise a memory from which the first threshold may be received. Additionally, or alternatively, the cooling processing unit 316 may comprise a user interface from which a user can input a particular signal to control the cooling processing unit 316. For example, the user interface may thus act as a thermostat.

As another option, one or more valves may be provided in the sublimation circuit 210, and the cooling processing unit 316 may be arranged to control one or more of the valves to control the flow rate of the sublimation fluid in the sublimation circuit 210.

As an even further option, any cooling circuit may comprise any number of valves for controlling the flow rate of a cooling fluid through a particular cooling circuit. The cooling processing unit 316 may be arranged to control one or more of these valves, for example in response to a signal received from a temperature sensor.

The transportation vehicle 200 may be provided with any number of temperature sensors. Each temperature sensor may be arranged to provide a signal to the cooling processing unit 316 indicative of a temperature of a particular part of the transportation vehicle 200, for example of a heat source 202.

In embodiments, one or more temperature sensors may be located at or near at least one of any heat exchanger, for example at or near a fluid inlet or fluid outlet of a heat exchanger, at or near a sublimation unit, for example at or near a fluid inlet or fluid outlet of a sublimation unit. A temperature sensor may be arranged to measure a temperature of a cooling fluid and/or a sublimation fluid, and/or any part of the vehicle and/or an air temperature inside any compartment of the vehicle.

As an even further option, the cooling processing unit 316 may also be arranged to control the pump 306 of the cooling circuit 310, to control a flow rate of cooling fluid through the cooling circuit 310.

The cooling capacity of the sublimator 208 may depend on the temperature of the sublimation fluid provided to the sublimator 208. It may be desired to provide the sublimation fluid at a particular temperature to the sublimator 208.

Optionally, the sublimation circuit 210 may comprise a compressor, a condenser and an expansion valve. As such, a vapour compression refrigeration cycle may be established, were the sublimator 108 acts as an evaporator arranged to extract thermal energy from the sublimation fluid.

Figure 4A:
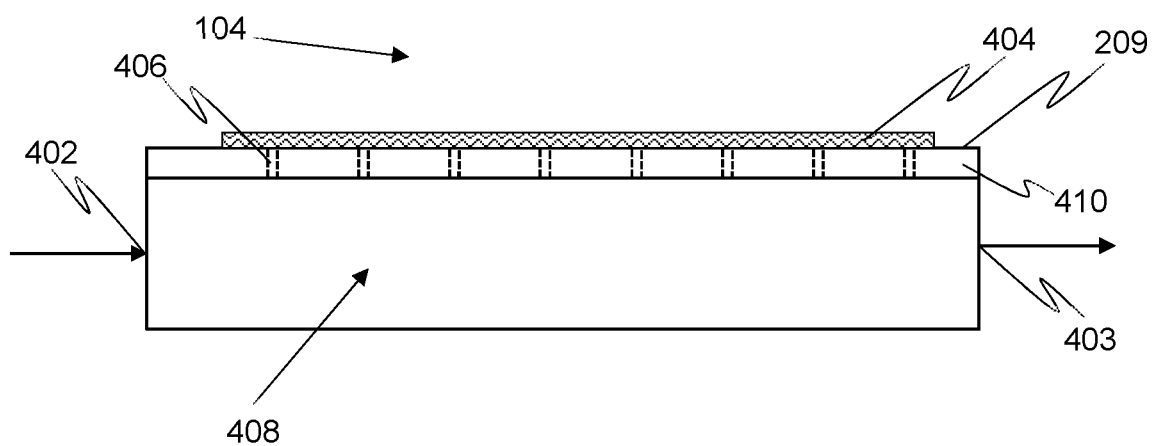
FIGS. 4A and 4B show embodiments of a sublimation unit.

FIG. 4A depicts an embodiment of a sublimation unit 208, which may be comprised by any embodiment of a cooling system. The sublimation unit 208 comprises a fluid inlet 402, and an outer surface 209 which is in use exposed to the low-pressure environment 104. A plurality of flow channels 406 is provided through the sublimation unit 208 which provide fluid communication between the fluid inlet 402 and the outer surface 209. At least part of the outer surface 209 may thus be formed by a porous plate 410, which is porous to sublimation fluid. The porous plate 410 is an example of an open channel structure.

In use, a layer 404 of solidified sublimation fluid may be present of the outer surface 209, which layer 404 is also exposed to the low-pressure environment 104. By virtue of the layer 404 being exposed to the low-pressure environment 104, at least part of the solidified sublimation fluid may sublimate into the low-pressure environment 104. Sublimated sublimation fluid may be replaced by new sublimation fluid flowing through one of the channels 406. Alternatively or additionally, solidified sublimation fluid may be present inside at least part of the channels 406, or even on an inside 408 of the sublimation unit 208.

The sublimation unit 208 comprises a fluid outlet 403 as a further option. As such, sublimation fluid may flow enter the sublimation unit 208 through the fluid inlet 402 and exit the sublimation unit via either the fluid outlet 403 or a channel 406. It will be appreciated that a sublimation unit 208 may comprise any number of channels which provide fluid communication between the fluid inlet 402 and the low-pressure environment 104, including only one.

Figure 4B:
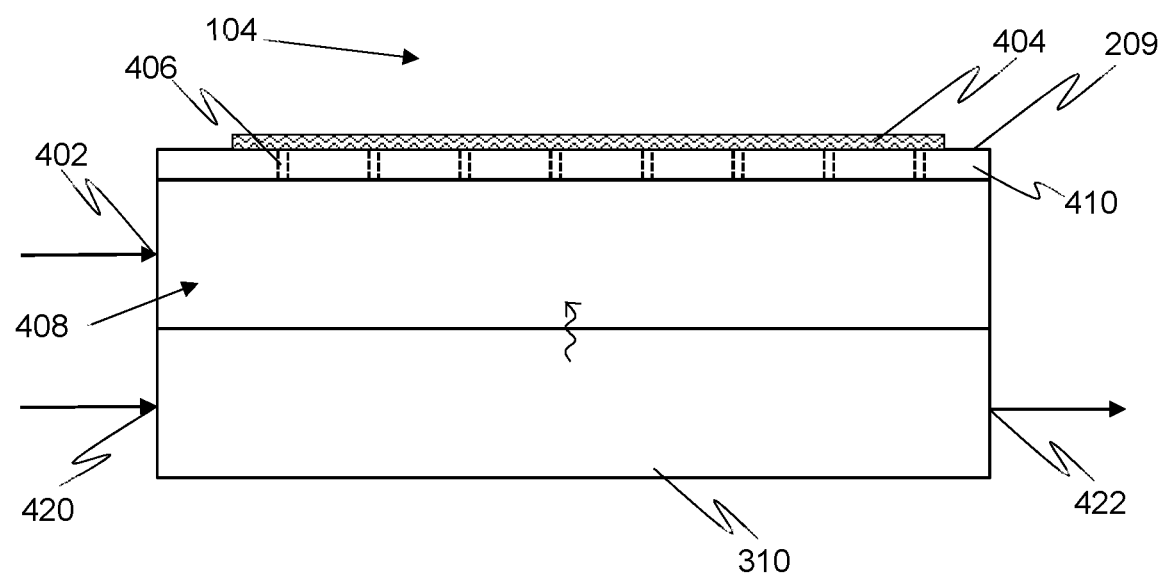

FIG. 4B depicts another embodiment of a sublimation unit 208, which may be comprised by any embodiment of the cooling system. In this particular embodiment, as an option, at least part of a cooling circuit 310 is provided in thermal contact with the inside 408 of the sublimation unit 208. Thermal contact may imply that thermal energy may be transferred between the cooling circuit 310 and the sublimation unit 208, for example via at least one or radiation, conduction and/or convection.

Cooling fluid may flow through the cooling circuit 310 between a cooling fluid inlet 420 and a cooling fluid outlet 422. As such, the cooling circuit may be a closed circuit implying that in use, the amount of cooling fluid in the cooling circuit may be substantially constant. For the sublimation fluid, the sublimation unit 208 provides an open system which implies that the amount of sublimation fluid in the cooling system may decrease over time as sublimation fluid sublimates into the low-pressure environment 104.

The cooling fluid may be used to extract thermal energy from one or more parts of a transportation vehicle travelling in a low-pressure environment. The cooling fluid may be a different fluid from the sublimation fluid, and may for example have a high heat capacity.

In general, any embodiment of a cooling system may comprise one or more flow rate sensor and/or one or more pressure sensors. A flow rate sensor may be used for example to measure a flow of sublimation fluid or cooling fluid. A pressure sensor may for example be used to a measure a fluid pressure of the sublimation fluid or the cooling fluid. For example, a pressure sensor may be arranged to measure a pressure of sublimation fluid in the sublimation unit, for example at or near the fluid inlet, at or near the fluid outer and/or at or near the outer surface.

A flow rate sensor may for example be embodied as a flow meter or any other device suitable for determining a volume of fluid passing the sensor in a particular amount of time which may be expressed in Litres/minute.

Furthermore, in general, any combination of sensor signals from any combination of one or more flow rate sensors, temperature sensors and/or pressure sensor may be used for controlling a cooling processing unit.

As an even further option, embodiments of the cooling system may comprise a plurality of cooling circuits, which may be arranged as completely separate circuits, or parallel and/or in series relative to each other, in any combination thereof. Each cooling circuit may be provided with one or more heat exchangers for receiving thermal energy from a heat source and transferring the thermal energy to cooling fluid flowing through the cooling circuit. One or more valves and/or pumps may be provided for controlling a flow rate of cooling fluid through each cooling circuit, allowing for separate control of cooling capacity per cooling circuit.

In the description above, it will be understood that when an element such as layer, region or substrate is referred to as being "on" or "onto" another element, the element is either directly on the other element, or intervening elements may also be present. Also, it will be understood that the values given in the description above, are given by way of example and that other values may be possible and/or may be strived for.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

It is to be noted that the figures are only schematic representations of embodiments of the invention that are given by way of non-limiting examples. For the purpose of clarity and a concise description, features are described herein as part of the same or separate embodiments, however, it will be appreciated that the scope of the invention may include embodiments having combinations of all or some of the features described.

The word 'comprising' does not exclude the presence of other features or steps than those listed in a claim. Furthermore, the words 'a' and 'an' shall not be construed as limited to 'only one', but instead are used to mean 'at least one', and do not exclude a plurality.

A person skilled in the art will readily appreciate that various parameters and values thereof disclosed in the description may be modified and that various embodiments disclosed and/or claimed may be combined without departing from the scope of the invention.

The invention claimed is:

1. A transportation vehicle comprising:
a cooling system,
the transportation vehicle arranged to be transported in a low-pressure environment in a pipe, and the cooling system comprising:
a sublimation circuit for transporting a sublimation fluid;
a first heat exchanger arranged to transfer thermal energy to the sublimation fluid;
a sublimation unit comprising a fluid inlet and an open channel structure comprising one or more channels, which are in fluid communication with the fluid inlet and with an outer surface of the sublimation unit, said sublimation unit being configured for fluid communication with the low-pressure environment inside the pipe;
a first flow controller for controlling a flow of the sublimation fluid through the sublimation circuit; and
a container arranged to hold the sublimation fluid and comprising a container outlet connected to the fluid inlet of the sublimation unit to supply sublimation fluid to the sublimation unit.

2. The transportation vehicle according to claim 1, wherein the sublimation unit comprises a fluid outlet, and wherein the fluid outlet of the sublimation unit is in fluid connection with the fluid inlet of the sublimation unit, via the sublimation unit, and the fluid outlet is in fluid connection with the first flow controller.

3. The transportation vehicle according to claim 1, wherein the first heat exchanger is formed by at least one of the sublimation circuit and the sublimation unit.

4. The transportation vehicle according to claim 1, further comprising:
- a cooling circuit for circulating a cooling fluid therethrough;
- a second heat exchanger, arranged to transfer thermal energy from a heat source to the cooling fluid; and
- a second flow controller for controlling a flow of the cooling fluid through the cooling circuit,
- wherein the first heat exchanger is arranged to transfer thermal energy between the cooling fluid and the sublimation fluid.

5. The transportation vehicle according to claim 1, further comprising:
- a first temperature sensor arranged to provide a first signal having a value indicative of a first temperature of a first part of the vehicle;
- a cooling processing unit arranged to:
  - receive the first signal;
  - compare the first signal value with a first threshold; and
  - control, in response to the outcome of the comparison, the first flow controller to control a flow rate of the sublimation fluid in the sublimation circuit.

6. The transportation vehicle according to claim 5, further comprising:
- a cooling circuit for circulating a cooling fluid therethrough;
- a second heat exchanger, arranged to transfer thermal energy from a heat source to the cooling fluid; and
- a second flow controller for controlling a flow of the cooling fluid through the cooling circuit, wherein:
  - the first heat exchanger is arranged to transfer thermal energy between the cooling fluid and the sublimation fluid; and
  - the cooling processing unit is further arranged to control the second flow control to control the flow of the cooling fluid through the cooling circuit.

7. The transportation vehicle according to claim 5, wherein first threshold is one of a value or an interval.

8. The transportation vehicle according to claim 1, wherein the sublimation fluid is water.

9. The transportation vehicle according to claim 1, wherein the open channel structure allows the sublimation fluid in the one or more channels to leave the cooling system through the channels in a gas phase.

10. The transportation vehicle according to claim 1, wherein the first heat exchanger is arranged to transfer thermal energy from a first part of the vehicle to the sublimation fluid.

11. The transportation vehicle according to claim 10, wherein the first part is a payload compartment of the transportation vehicle.

12. The transportation vehicle according to claim 10, wherein the first part is an electromagnetic propulsion module or a magnetic suspension unit comprised by the transportation vehicle.

13. The transportation vehicle according to claim 10, wherein the sublimation unit comprises an exposed section provided on an outside of the transportation vehicle, which exposed section provides the outer surface of the sublimation unit, and wherein the one or more channels of the sublimation unit are in fluid communication with the low-pressure environment inside the pipe at the exposed section.

14. A transportation system comprising:
- the transportation vehicle according to claim 10;
- the pipe for guiding the transportation vehicle; and
- a pressure control system arranged to maintain a pressure level in the pipe at 10% or less of the pressure outside the pipe.

15. The transportation system according to claim 14, further comprising a fluid recuperation system for recuperating sublimation fluid from the pipe.

16. The transportation vehicle according to claim 1, wherein the transportation vehicle is arranged to be transported in the low-pressure environment in the pipe within the atmosphere of Earth.

17. The transportation system according to claim 15, wherein the fluid recuperation system is positioned inside the pipe or between the pipe and the pressure control system.

18. A method for cooling a first part of a transportation vehicle travelling in a low-pressure environment in a pipe, comprising:
- transporting a sublimation fluid from a container through a sublimation circuit to an exposed end of a sublimation unit which is exposed to the low-pressure environment in the pipe;
- allowing transfer of thermal energy from the first part of the transportation vehicle to the sublimation fluid; and
- allowing sublimation fluid to be subsequently solidified and sublimated at the exposed end of the sublimation unit.

19. The method according to claim 18, wherein the low-pressure environment is provided within the atmosphere of Earth.

* * * * *